(12) United States Patent
Masuda

(10) Patent No.: US 10,140,746 B2
(45) Date of Patent: Nov. 27, 2018

(54) IMAGE PROCESSING DEVICE, IMAGE PROCESSING METHOD, AND COMPUTER PROGRAM

(75) Inventor: Tooru Masuda, Minato-ku (JP)

(73) Assignee: SONY CORPORATION, Tokyo (JP)

( * ) Notice: Subject to any disclaimer, the term of this patent is extended or adjusted under 35 U.S.C. 154(b) by 801 days.

(21) Appl. No.: 12/995,610

(22) PCT Filed: Mar. 2, 2010

(86) PCT No.: PCT/JP2010/053293
§ 371 (c)(1),
(2), (4) Date: Dec. 1, 2010

(87) PCT Pub. No.: WO2010/116820
PCT Pub. Date: Oct. 14, 2010

(65) Prior Publication Data
US 2011/0181774 A1    Jul. 28, 2011

(30) Foreign Application Priority Data
Apr. 8, 2009    (JP) ................................ 2009-094370

(51) Int. Cl.
*G06T 13/80*    (2011.01)
*G06T 11/60*    (2006.01)

(52) U.S. Cl.
CPC .............. *G06T 13/80* (2013.01); *G06T 11/60* (2013.01)

(58) Field of Classification Search
CPC ... G06T 11/60; G06T 13/80; G06T 2219/028; G06T 2200/32; G06T 7/0012;
(Continued)

(56) References Cited

U.S. PATENT DOCUMENTS

| 6,339,431 | B1 * | 1/2002 | Ohmori et al. ............... 345/619 |
| 7,606,397 | B2 * | 10/2009 | Kowald ........................ 382/118 |

(Continued)

FOREIGN PATENT DOCUMENTS

| JP | 2000 113208 | 4/2000 |
| JP | 2000-113208 | 4/2000 |

(Continued)

OTHER PUBLICATIONS

International Search Report dated Apr. 6, 2010 in PCT/JP10/053293 filed Mar. 2, 2010.

(Continued)

*Primary Examiner* — Gregory J Tryder
*Assistant Examiner* — Kwang Lee
(74) *Attorney, Agent, or Firm* — Oblon, McClelland, Maier & Neustadt, L.L.P.

(57) ABSTRACT

Provided is an image processing device. A feature point detection unit detects a feature point from moving image data. An association processing unit associates the feature point with additional information, the feature point being selected based on feature point selection information for selecting one or at least two feature points that display the additional information displayed to be accompanied with the feature point. A motion analysis unit analyzes a changing behavior of the feature point through reproduction of moving image data. A data generating unit generates data indicating change content to change display of the additional information associated with the feature point based on motion information indicating the behavior of the feature point analyzed by the motion analysis unit and a display scenario indicating a change pattern to change the additional information added to the feature point according to the behavior of the feature point.

19 Claims, 22 Drawing Sheets

(58) Field of Classification Search
CPC .. H04N 1/00244; H04N 1/0097; H04N 5/772;
H04N 9/8205; H04N 21/44012; H04N
5/9261; H04N 1/3336; H04N 21/234318;
G06Q 10/06; G06Q 10/06375; G06F
19/321; G11B 27/105; G11B 27/34;
H05B 33/0854
USPC .......................................................... 345/661
See application file for complete search history.

(56) References Cited

U.S. PATENT DOCUMENTS

| | | | |
|---|---|---|---|
| 7,788,690 B2* | 8/2010 | Ito et al. ........................ | 725/47 |
| 2004/0131330 A1* | 7/2004 | Wilkins et al. ................ | 386/55 |
| 2006/0126963 A1* | 6/2006 | Sonoda et al. ................ | 382/276 |
| 2006/0265731 A1* | 11/2006 | Matsuda ....................... | 725/131 |

FOREIGN PATENT DOCUMENTS

| | | |
|---|---|---|
| JP | 2006 227838 | 8/2006 |
| JP | 2006-227838 | 8/2006 |

OTHER PUBLICATIONS

"PMB (Picture Motion Browser)", Decorate and Upload Images (EDECO), http://support.d-imaging.sony.co.jp/www/disoft/jp/pmb/feature/web/edeco.html, Apr. 7, 2009, pp. 1-6.

* cited by examiner

FIG.2

| RENDERING DATA | TIME | ACTION |
|---|---|---|
| image01 | 00:01:05 | FIXING DISPLAY |
| image02 | 00:01:21 | TRACKING DISPLAY AT FEATURE A |
| ⋮ | ⋮ | ⋮ |

Columns: 1521, 1522, 1523

(a)    (b)

(a)  (b)

(a)　　　　　　　　　(b)

IMAGE PROCESSING DEVICE, IMAGE PROCESSING METHOD, AND COMPUTER PROGRAM

TECHNICAL FIELD

The present invention relates to an image processing device, an image processing method, and a computer program, and more particularly, an image processing device, an image processing method, and computer program that display additional information displayed to be accompanied with a feature point in an image.

BACKGROUND ART

In order to make an image imaged by an imaging device, such as a digital video camera or a digital still camera, into a more interesting image, a user adds comments or sound effects to the image to create an original image. For example, a balloon may be provided in the vicinity of a face of a person in the image to write comments or a stamp may be added to highlight a motion of a person.

In a related art, when another image is added to moving image content, a user has instructed to change a display position of the additional image according to a temporal change while confirming content of moving image content in order to change the additional image according to the motion of the moving image. Also, the user has created a changed image in synchronization with the temporal change of the image moving image content in order to change the additional image according to the motion of the moving image.

Citation List

Patent Literature

Non-Patent Literature 1: Decorate and Upload images (eDeco), [see Apr. 7, 2009], Internet <URL: http://support.d-imaging.sony.co.jp/www/disoft/jp/pmb/feature/web/edeco.html>

SUMMARY OF INVENTION

Technical Problem

However, it is difficult to add an image, for example, to a moving person in an image, and a related method takes significant effort and time to set an additional image display. When a plurality of additional images are set, an operation is complicated and such an issue becomes more severe.

The present invention is made in view of the above-mentioned issue, and aims to provide an image processing device, an image processing method and a computer program which are novel and improved, and which are capable of simply adding additional information to a moving object in a moving image.

Solution to Problem

According to the first aspect of the present invention in order to achieve the above-mentioned object, there is provided an image processing device including: a feature point detection unit for detecting a feature point from moving image data; an association processing unit for associating the feature point with additional information, the feature point being selected based on feature point selection information for selecting one or at least two feature points that display the additional information displayed to be accompanied with the feature point; a motion analysis unit for analyzing a changing behavior of the feature point through reproduction of moving image data; and a data generating unit for generating data indicating change content to change display of the additional information associated with the feature point based on motion information indicating the behavior of the feature point analyzed by the motion analysis unit and a display scenario indicating a change pattern to change the additional information added to the feature point according to the behavior of the feature point.

According to the present invention, when additional information is displayed to be accompanied with a feature point in moving image data, data is automatically generated by the data generating unit based on the motion information indicating the behavior of the feature point and a display scenario indicating a change pattern to change the additional information added to the feature point according to the behavior of the feature point. Accordingly, it is possible to simply add the additional information to a moving object in a moving image.

The image processing device of the present invention may include an input unit to which the feature point selection information is input. Here, the image processing device may include a display scenario storage unit for storing one or at least two display scenarios indicated by the behavior pattern of the feature point and a display method for additional information added to a feature point matching the behavior pattern. Display scenario selection information for selecting the display scenario to change the additional information added to the selected feature point is further input to the input unit. The data generating unit generates data to display the additional information using a display method defined in the display scenario when the data generating unit has detected a behavior of the feature point matching the behavior pattern of the feature point of the selected display scenario from the motion information, for the feature point selected by the feature point selection information.

Also, the image processing device of the present invention may include an additional information storage unit for storing one or at least two pieces of additional information. In this case, selection information for selecting the additional information accompanied with the feature point is input to the input unit. Further, the image processing device may include a hand-drawn data input unit to which additional information added to moving image data is input by hand-drawing.

The data generating unit may generate data to change a display position of the additional information associated with the feature point based on a position of the feature point in the image of moving image data recognized from the motion information. Also, the data generating unit may generate data to change a size of the additional information associated with the feature point based on a size of the feature point relative to a display size of moving image data recognized from the motion information.

Further, the data generating unit may generate data to display the additional information associated with the feature point according to a change of a facial expression of the feature point recognized from the motion information. Also, the data generating unit may generate data to change display of the additional information associated with the feature point according to a movement speed of the feature point recognized from the motion information. When selection information to select at least two feature points is input from the input unit, the data generating unit may generate data to generate a display size of the additional information associated with the feature point according to a distance between the feature points.

According to the second aspect of the present invention in order to achieve the above-mentioned object, there is provided An image processing method including the steps of: detecting a feature point from moving image data; associating one or at least two feature points with additional information, the feature points displaying the additional information displayed to be accompanied with the feature point; analyzing a changing behavior of the feature point through reproduction of moving image data; and generating data indicating change content to change display of the additional information associated with the feature point based on motion information indicating the analyzed behavior of the feature point and a display scenario indicating a change pattern to change the additional information added to the feature point according to the behavior of the feature point.

Further, in order to resolve the object, according to another aspect of the present invention, a computer program for causing a computer to function as the image processing device is provided. The computer program is stored in a storage device included in the computer, and read and executed by a CPU included in the computer, such that the computer function as the image processing device. Also, a computer-readable recording medium having a computer program recorded thereon is also provided. The recording medium is, for example, a magnetic disk, an optical disk, or the like.

Advantageous Effects of Invention

According to the present invention as described above, it is possible to provide an image processing device, an image processing method, and a computer program capable of simply adding additional information to a moving object in a moving image.

BRIEF DESCRIPTION OF DRAWINGS

FIG. 2 is an illustrative diagram showing a configuration example of a metadata storage unit according to the embodiment.

REFERENCE SIGNS LIST

Figure 1:
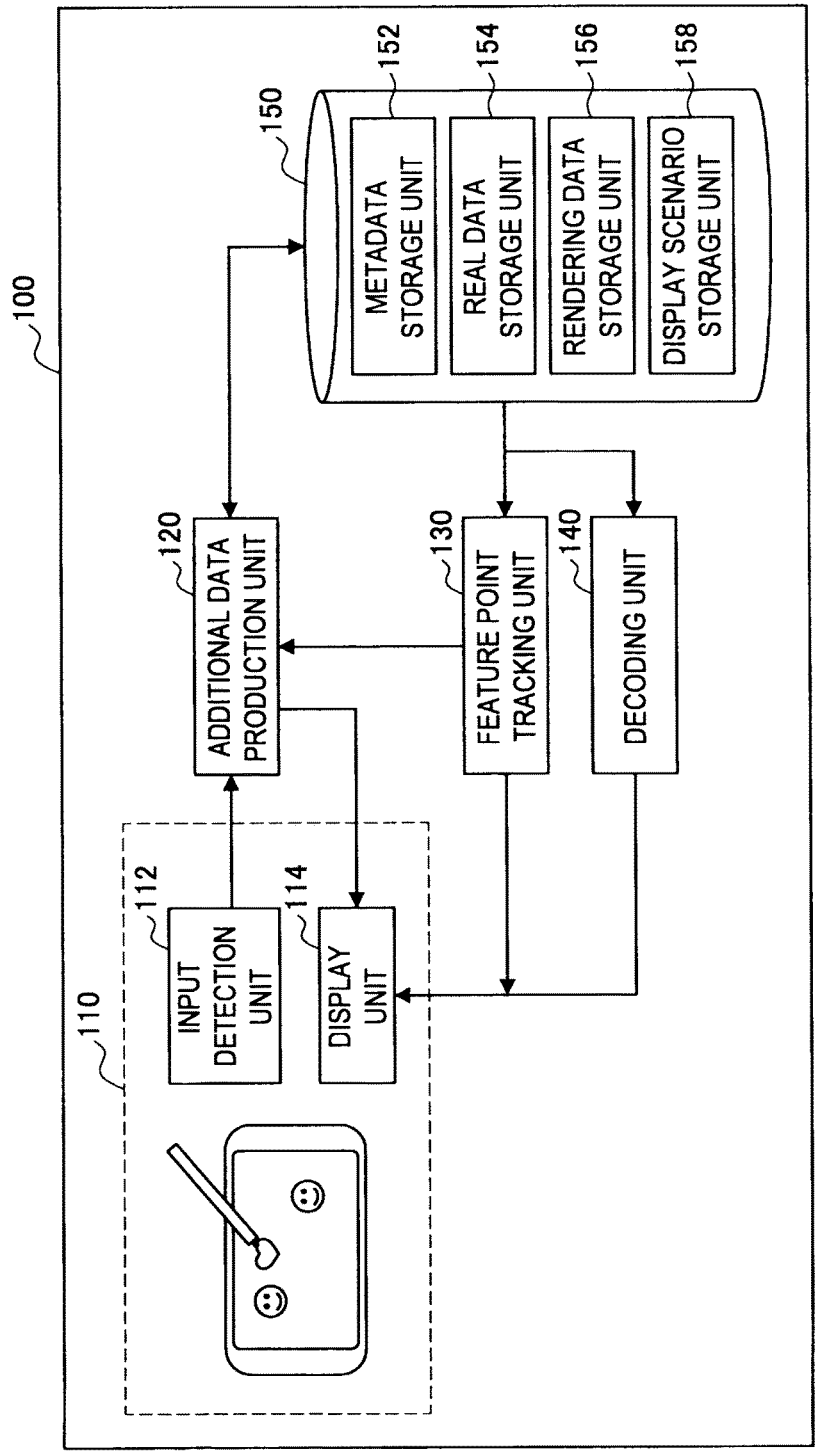
FIG. 1 is functional block diagram showing a configuration of an image processing device according to an embodiment of the present invention

100 Image processing device
110 Input display unit
112 Input detection unit
114 Display unit
120 Additional data creation unit
130 Feature point tracking unit
140 Decoding unit
150 Storage unit
152 Metadata storage unit
154 Real data storage unit
156 Drawing data storage unit
158 Display scenario storage unit

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, the description will be given in the following order.

1. Configuration of image processing device
2. Display processing method by image processing device
<1. Configuration of Image Processing Device>

First, a schematic configuration of an image processing device 100 according to an embodiment of the present invention will be described based on FIGS. 1 and 2. Further, FIG. 1 is functional block diagram showing a configuration of the image processing device 100 according to the present embodiment. FIG. 2 is an illustrative diagram showing a configuration example of a metadata storage unit 152 according to the present embodiment.

The image processing device 100 according to the present embodiment is for example, a reproduction device capable of reproducing moving image content imaged by an imaging device such as a digital video camera or a digital still camera, a recording and reproduction device capable of recording and reproducing moving image content, or the like. Also, the image processing device 100 according to the present embodiment may be embodied as an application executed by a personal computer. Such an image processing device 100 includes an input display unit 110, an additional data creation unit 120, a feature point tracking unit 130, a decoding unit 140, and a storage unit 150, as shown in FIG. 1.

The input display unit 110 is a functional unit by which input of information from a user is performed or that outputs information to the user, and includes an input detection unit 112 and a display unit 114. The input display unit 110 of the present embodiment may be a touch panel including a sensor, such as a touch pad, as the input detection unit 112 on the surface of the display unit 114 configured of, for example, a liquid crystal display element or an organic EL element. The input detection unit 112 may detect a contact of, for example, a stylus or a finger with the surface of the input display unit 110. A locus of a touch manipulation to contact the surface of the input display unit 110 may be acquired from the detection result of the input detection unit 112 and input as hand-drawn data or, for example, icons displayed on the display unit 114 may be selected. The display unit 114 displays moving image content, hand-drawn data, and the like and presents them to the user.

The additional data creation unit 120 creates additional data, such as hand-drawn data, or additional data metadata, and performs a control to display the moving image content, the additional data and the like. Here, the moving image content is real moving image data imaged by an imaging device, and the additional data is data added to decorate the moving image of the moving image content. Also, the additional data metadata is information of additional data the display of which is changed over time of the moving image content.

For example, the additional data creation unit 120 acquires a locus of a touch manipulation contacting the surface of the input display unit 110 from the detection result input by the input detection unit 112 and generates hand-drawn data as additional data. The additional data creation unit 120 displays the generated hand-drawn data on the display unit 114 and records the hand-drawn data in the storage unit 150, which will be described below. Also, the additional data creation unit 120 specifies one or at least two feature points to which additional data is to be added, from among feature points in the moving image detected by the feature point tracking unit 130, which will be described below, based on the content of the moving image displayed on the display unit 114 and the detection result of the input detection unit 112. The additional data creation unit 120 associates the specified feature point with the additional data to be accompanied with the feature point and displayed, based on the input information from the input detection unit 112, and records the association in the storage unit 150.

Further, using contact position information in the input display unit 110, motion information of the feature point and the additional data, the additional data creation unit 120 creates additional data metadata according to the display scenario. Here, the display scenario is information indicating a change pattern to change display of the additional data added to the feature point according to the behavior of the feature point. The additional data creation unit 120 generates motion information indicating the behavior of the feature point from the position information of the feature point at each time detected by the feature point tracking unit 130. The additional data creation unit 120 creates additional data metadata and records the additional data metadata in the storage unit 150. Thus, the additional data creation unit 120 performs a display process for creating the additional data metadata. Further, the display process in the additional data creation unit 120 will be described in detail below.

The feature point tracking unit 130 is a functional unit that extracts a feature point in the moving image and tracks the extracted feature point. The feature point tracking unit 130 extracts, for example, a portion with a feature, such as a face of a person, as the feature point, from a given image constituting the moving image content. The extraction of the feature point may be performed using a related method. Also, the feature point tracking unit 130 may recognize and track a position of the moving feature point through the reproduction of the moving image content. The feature point tracking unit 130 may output information of the extracted feature point to the display unit 114 and display a mark, such as a frame, at the feature point displayed on the display unit 114. Also, the feature point tracking unit 130 outputs information of the feature point to the additional data creation unit 120, for creation of the additional data metadata.

The decoding unit 140 decodes moving image content or still image content. The decoding unit 140 reads moving image content or still image content stored in the storage unit 150, decodes the content, and outputs the resultant content to the display unit 114. Accordingly, the moving image content or the still image content may be displayed on the display unit 114.

The storage unit 150 is a storage unit that stores various pieces of information. The storage unit 150 according to the present embodiment includes a metadata storage unit 152, a real data storage unit 154, a drawing data storage unit 156, and a display scenario storage unit 158. The metadata storage unit 152 is a storage unit that stores the additional data, such as hand-drawn data, or the additional data metadata. The metadata storage unit 152 stores, for example, drawing data 1521 as a display processing object, a time 1522 when the display process is performed, and an action 1523 indicating processing content of the drawing data, which are associated with each other, as shown in FIG. 2. The drawing data 1521 is, for example, additional data such as hand-drawn data input from the input display unit 110 or a previously set stamp. The time 1522 indicates a time in the moving image content to which the additional data metadata corresponds. For example, in the example of FIG. 2, the processing content, such as: drawing data "image01" being "fixedly displayed" at a time "00:01:05" and drawing data "image02" being "displayed while tracking a feature point A" at a time "00:01:21," is stored in the metadata storage unit 152.

The real data storage unit 154 stores moving image content or still image content imaged by an imaging device. The drawing data storage unit 156 stores additional data, such as the hand-drawn data input from the input display unit 110 or the previously set stamp. Also, information on a drawing tool necessary for creating the hand-drawn data may also be stored in the drawing data storage unit 156. The additional data stored in the drawing data storage unit 156 may be stored, for example, in association with unique names such as "image01" and "image02" shown in FIG. 2. The display scenario storage unit 158 stores display scenarios. The display scenario may be previously set or added by a user.

The configuration of the image processing device 100 according to the present embodiment has been described. The image processing device 100 can change the display of the additional data added to the feature point based on the motion information indicating the behavior of the feature point of the moving image content and the display scenario, and automatically generate the additional data metadata. Hereinafter, an image processing method in the image processing device 100 will be described in detail.

<2. Display processing Method in Image Processing Device>

[Process of Adding Hand-Drawn Data to Moving Image Content]

Figure 3A:
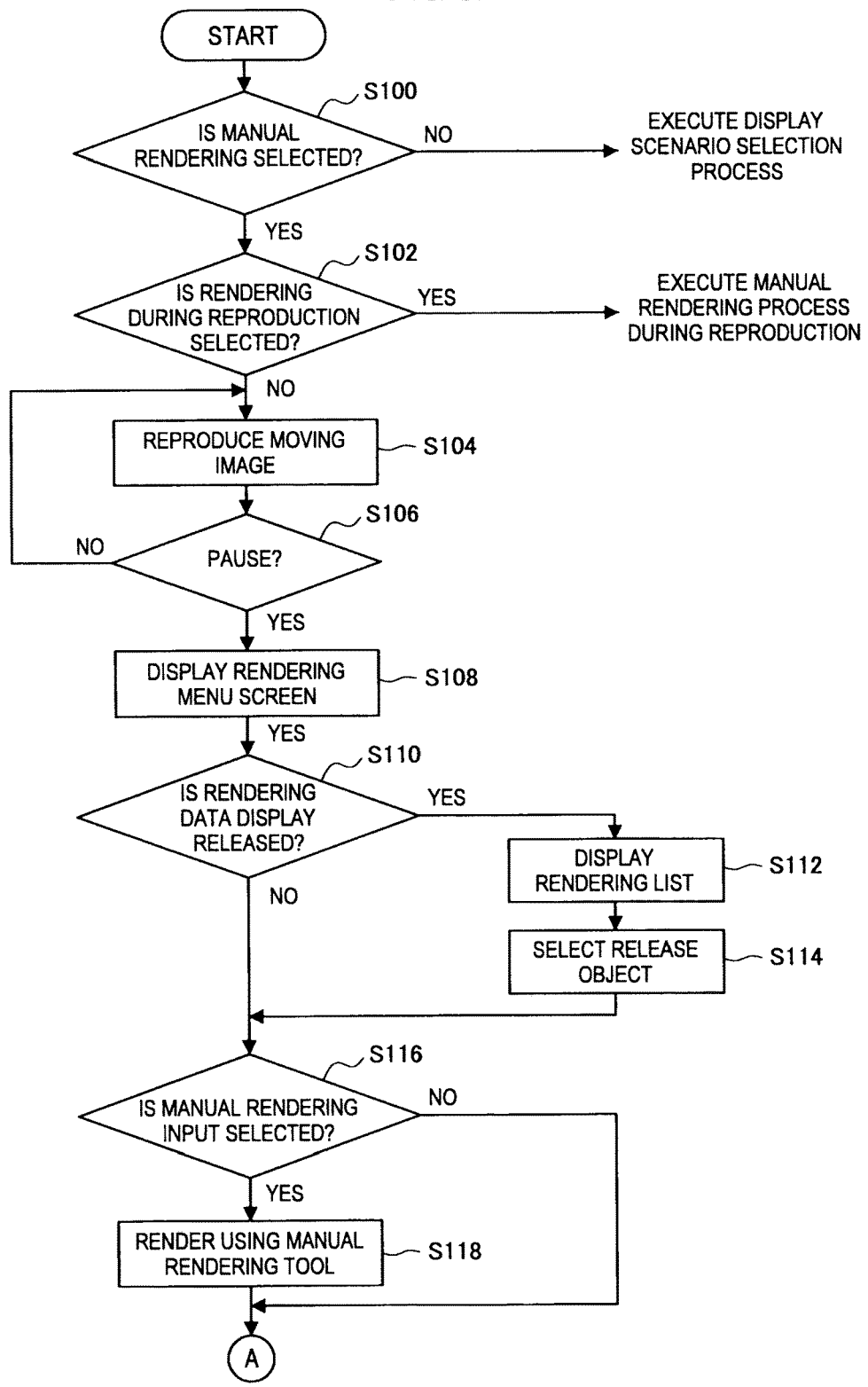
FIG. 3A is a flowchart showing a process of adding hand-drawn data to moving image content according to the embodiment.
Figure 3B:
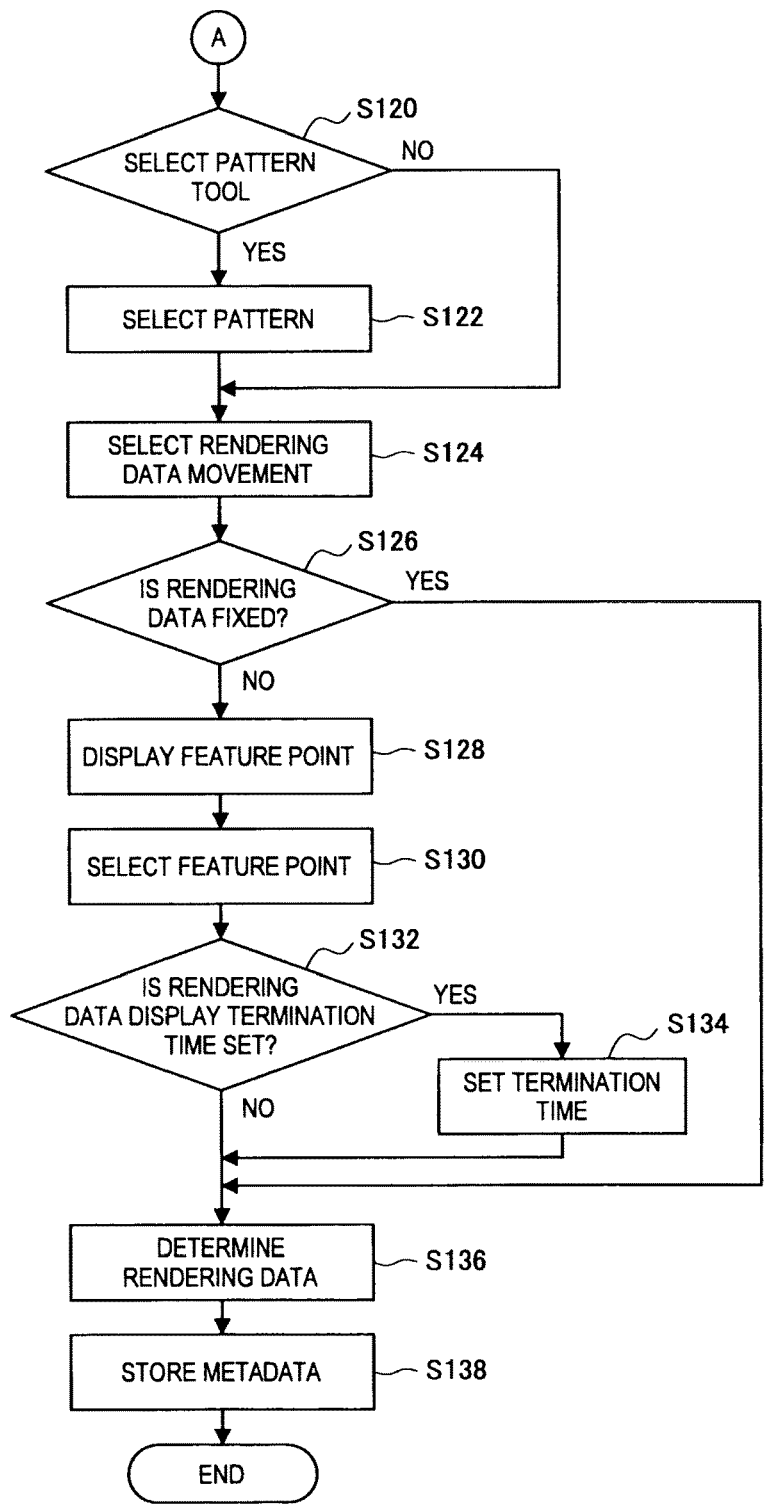
FIG. 3B is a flowchart showing a process of adding hand-drawn data to moving image content according to the embodiment.

First, a process of adding hand-drawn data moving image content according to the present embodiment will be described based on FIGS. 3A and 3B. Further, FIGS. 3A and 3B are a flowchart showing the process of adding hand-drawn data to moving image content according to the present embodiment.

The process of adding hand-drawn data to moving image content may be initiated by decoding the moving image content stored in the real data storage unit 154 of the storage unit 150 using the decoding unit 140 and displaying the resultant moving image content on the display unit 114. The display process to add additional data to moving image content includes a process of adding hand-drawn data, which is described herein, a display process based on display scenario, which will be described below, a display process performing by inputting the hand-drawn data while reproducing the moving image content, and the like. First, the user selects a display process to be executed.

For example, the user selects whether to perform manual drawing using hand-drawing (step S100). When the user selects not to perform the manual drawing, a display scenario selection process, which will be described below, is executed. On the other hand, when the user selects to perform the manual drawing, the user then selects whether to perform drawing during reproduction of the moving image content (step S102). When the user selects to perform drawing during reproduction, the hand-drawing process during reproduction which will be described below is executed. On the other hand, when the user selects not to perform the hand-drawing process during reproduction, reproduction of the moving image content is initiated (step S104).

When the moving image content is reproduced, the user views the moving image content displayed on the display unit 114 and pauses reproduction of the moving image content at a time desired to add additional data. The moving image content continues to be reproduced until the reproduction of the moving image content pauses (step S106). When the reproduction of the moving image content pauses in step S106, a drawing menu screen is displayed on the display unit 114 (step S108).

Figure 5:
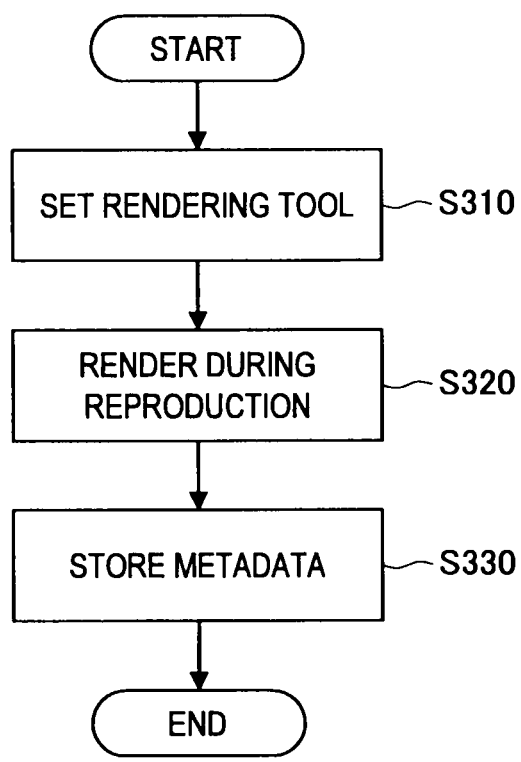
FIG. 5 is a flowchart showing a hand-drawing process during reproduction according to the embodiment.

The drawing menu screen 200a may have, for example a screen configuration as shown in FIG. 5. The drawing menu screen 200a includes a content display area 210 in which the moving image content is displayed, and a manipulation icon display area 220 in which a manipulation icon such as a play icon 222a, a rewind icon 222b, and a fast forward icon 222c is displayed. A hand-drawing icon 230 to initiate a hand-drawn data input process, a fix icon 240 for displaying previously set additional data, and a list display icon 250 for displaying a list of additional data metadata previously registered are displayed at an edge of the content display area 210.

Figure 6:
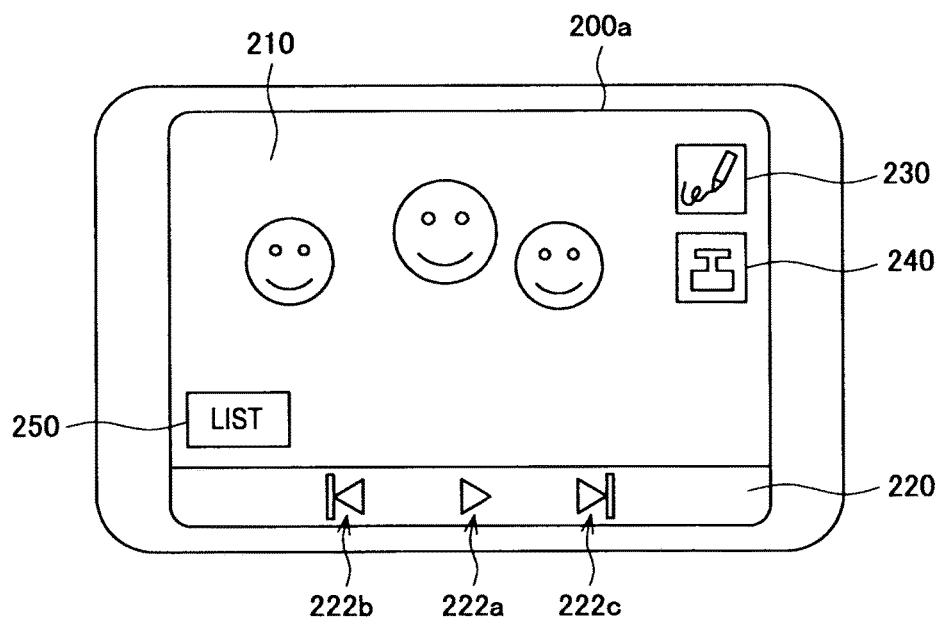
FIG. 6 is an illustrative diagram showing an example of a drawing menu screen.

In this case, the user releases display of the drawing data that is the previously registered additional data at a pause time. That is, the user may set to delete the display of the drawing data that begins to be displayed at a time earlier than a current time and continues to be displayed even at the current time. Where the user selects whether to perform the display of the drawing data (step S110) and selects a manipulation to release the display of the drawing data, the user selects the list display icon 250 by touching the list display icon 250 in the drawing menu screen 200a, for example, using the stylus (step S112). Then, the list of previously registered drawing data is displayed on the display unit 114 at the pause time. In this list, for example, drawing data and an action among the additional data metadata shown in FIG. 2 are displayed. The user touches the drawing data for which the display is to be released, for example, using the stylus touch, and selects a release object (step S114). When the release object selected in step S114 is determined, the drawing data is deleted at that time, and the additional data creation unit 120 primarily holds such information as information recorded in the metadata storage unit 152 of the storage unit 150. The drawing menu screen 200a shown in FIG. 6 is displayed on the display surface of the display unit 114 again.

Figure 7:
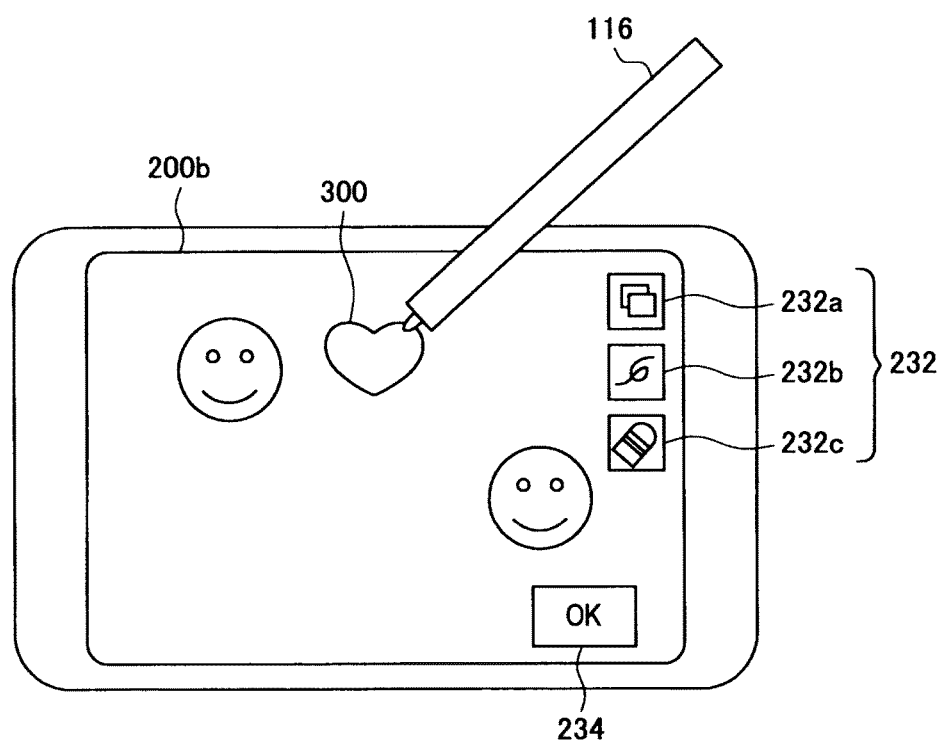
FIG. 7 is an illustrative diagram showing an example of a hand-drawing drawing screen.

When the user selects not to perform the drawing data display release in step S110 or when a release object is determined by step S114, the user then selects whether to perform data input by hand-drawing (step S116). When the user selects to perform data input by hand-drawing, drawing by a hand-drawing tool may be performed (step S118). The data input by hand-drawing may be performed, for example, by selecting the hand-drawing icon 230 shown in FIG. 6. When the user selects the hand-drawing icon 230 by touching the hand-drawing icon 230, for example, using the touch pen, the screen transitions from the drawing menu screen 200a, for example, to a hand-drawing drawing screen 200b shown in FIG. 7.

The moving image content at a time when the reproduction pauses in step S106 is displayed on the hand-drawing drawing screen 200b and a tool icon 232 for inputting hand-drawn data is displayed at an edge thereof. The tool icon 232 includes, for example, a color selection icon 232a, a line type icon 232b, and a delete icon 232c. The user selects a drawing line or color from the tool icon 232, for example, using the stylus 16 and performs drawing by tracing the surface of the input display unit 110. The additional data creation unit 120 displays the locus from the detection result of the input detection unit 112 as the hand-drawn data 300 on the display unit 114. When the hand-drawn data 300 has been input, the user selects, for example, the OK icon 234 of FIG. 7 to determine to display the input hand-drawn data 300 in the moving image content at a time displayed on the display unit 114. The additional data creation unit 120 primarily holds such information as information recorded in the metadata storage unit 152 of the storage unit 150.

When the user has not selected the hand-drawing input in step S116 or when the hand-drawn data input is terminated in step S118, the user selects whether to input the previously set additional data (hereinafter referred to as "pattern data") as shown in FIG. 3B (step S120). When the user selects to perform the data input by the pattern data, the user may perform drawings by the pattern data (step S122). The data input by the pattern data may be performed, for example, by selecting the fix icon 240 shown in FIG. 6. When the user selects the fix icon 240 by touching the fix icon 240, for example, using the stylus, the screen transitions from the drawing menu screen 200a, for example, to a pattern drawing screen 200c shown in FIG. 8.

Figure 8:
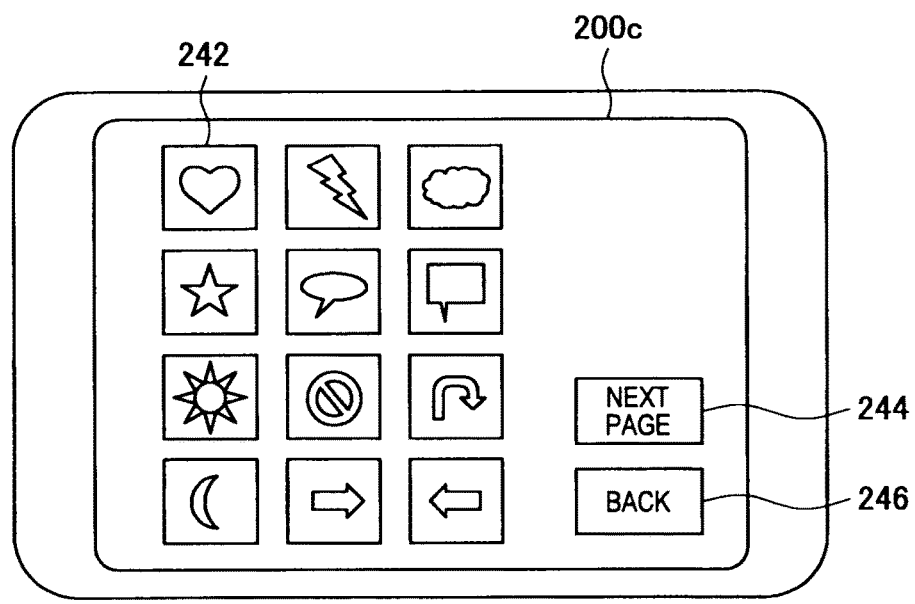
FIG. 8 is an illustrative diagram showing one example of a pattern drawing screen.

A plurality of pattern FIG. 242 are displayed in the pattern drawing screen 200c, as shown in FIG. 8. When the pattern figures are all difficult to display in one screen, a "next page" icon 244 is displayed as shown in FIG. 8, and a list of next pattern FIG. 242 may be displayed on the display unit 114 by selecting the icon 244. A "previous page" icon is displayed on the next screen. When one pattern FIG. 242 is selected as the additional data added to the moving image content, the moving image content at a time when the reproduction pauses in step S106 is displayed. When the user brings, for example, the touch pen 116 into contact with the surface of the input display unit 110 on the screen, the selected pattern FIG. 242 is displayed in the moving image content at that time. On such a screen, the color, size and the like of the pattern FIG. 242 may be properly changed. When the display content is determined, the additional data creation unit 120 primarily holds such information as information recorded in the metadata storage unit 152 of the storage unit 150. Thereafter, the screen returns to the drawing menu screen 200a shown in FIG. 6. Further, the display of the pattern FIG. 242 onto the moving image content may be canceled by selecting the "back" icon 246 on the pattern drawing screen 200c of FIG. 8.

Figure 9:
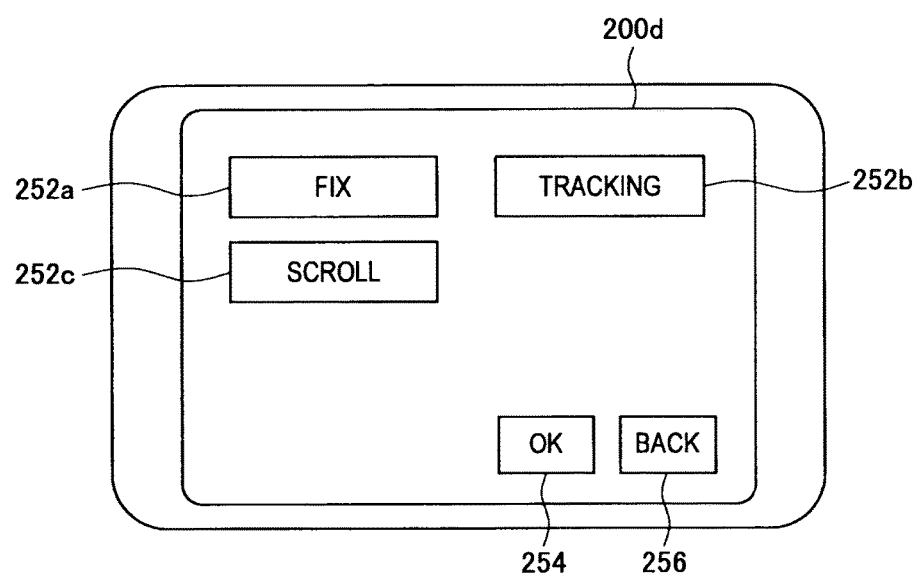
FIG. 9 is an illustrative diagram showing an example of a motion setting screen.

When the input of the drawing data displayed in the moving image content is completed through the process in steps S116 to S122, the user selects a motion of the drawing data (step S124). The user first selects drawing data to set the motion from the drawing data displayed on the display unit 114. When the drawing data to set the motion is selected, for example, a motion setting screen 200d as shown in FIG. 9 is displayed. Motion icons indicating the type of the motion of the drawing data are displayed on the motion setting screen 200d. The motion icons include, for example, a "fix" icon 252a, a "tracking" icon 252b, a "scroll" icon 252c, and the like. The user selects the motion of the drawing data from the motion icons of the motion setting screen 200d and selects the OK icon 254 to determine the motion. Further, the user may cancel motion setting for the drawing data by selecting a "back" icon 256 in the motion setting screen 200d.

Then, a determination as to whether a fix display is selected as the motion of the drawing data is made by the additional data creation unit 120 (step S126). Such a determination may be performed, for example, based on whether the "fix" icon 252a is selected on the motion setting screen 200d shown in FIG. 9. When it is determined by the additional data creation unit 120 in step S126 that a display other than the fix display is selected as the motion of the drawing data, a feature point selection screen 200e on which all feature points in the moving image content as an object associated with the drawing data are displayed is displayed on the display unit 114 (step S128).

Figure 10:
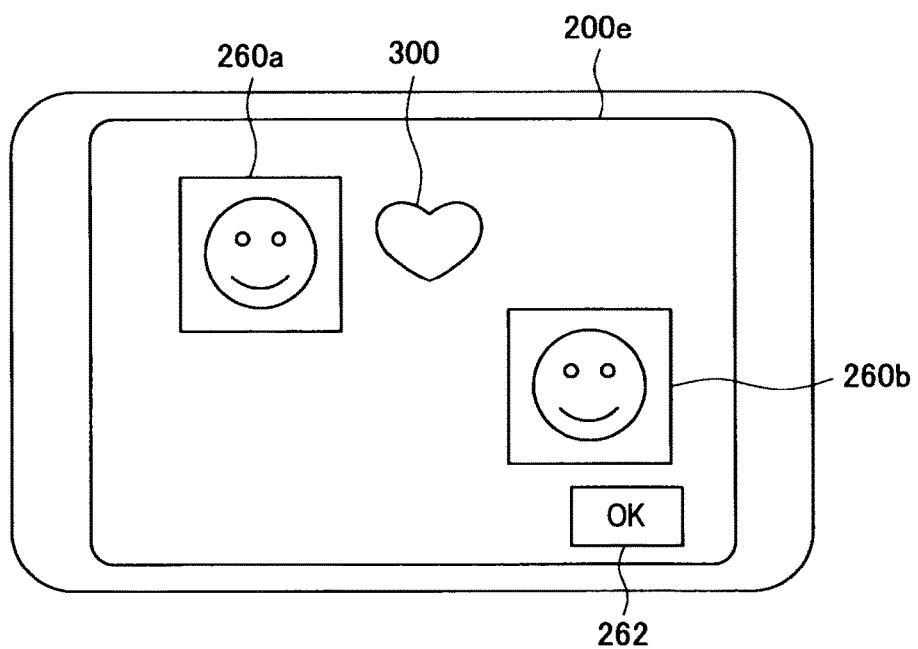
FIG. 10 is an illustrative diagram showing an example of feature point selection screen.
Figure 11:
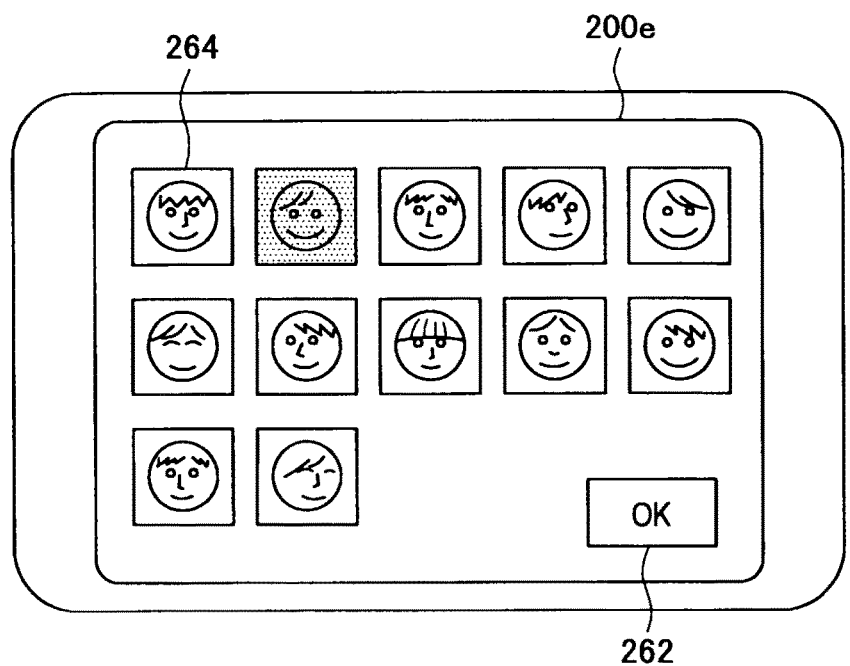
FIG. 11 is an illustrative diagram showing another example of feature point selection screen.

For example, the feature point selection screen 200e may be structured to show feature points extracted by the feature point tracking unit 130 by displaying frames 260a and 260b at the feature points, for the display of the moving image content at a time when the reproduction pauses, as shown in FIG. 10. Alternatively, as shown in FIG. 11, all feature points 264 in the moving image content at a time when the reproduction pauses may be displayed as a list. The user selects one or at least two feature points associated with the drawing data from the feature points displayed on the feature point selection screen 200e and selects the OK icon 262 to determine an association with the drawing data (step S130). Accordingly, the motion of the drawing data at that time or later is determined.

Then, the user selects whether to set a display end time for the drawing data (step S132). When the user selects to set the display end time of the drawing data, the end time can be set, and the user sets the end time (step S134). Thereafter, when the end time setting is terminated, display content of the drawing data at that time is determined (step S136). The determination of the display content is performed, for example, by selecting the play icon 222a of the drawing menu screen 200. The determined display content is recorded as metadata in the metadata storage unit 152 of the storage unit 150 by the additional data creation unit 120 (step S138).

Figure 12:
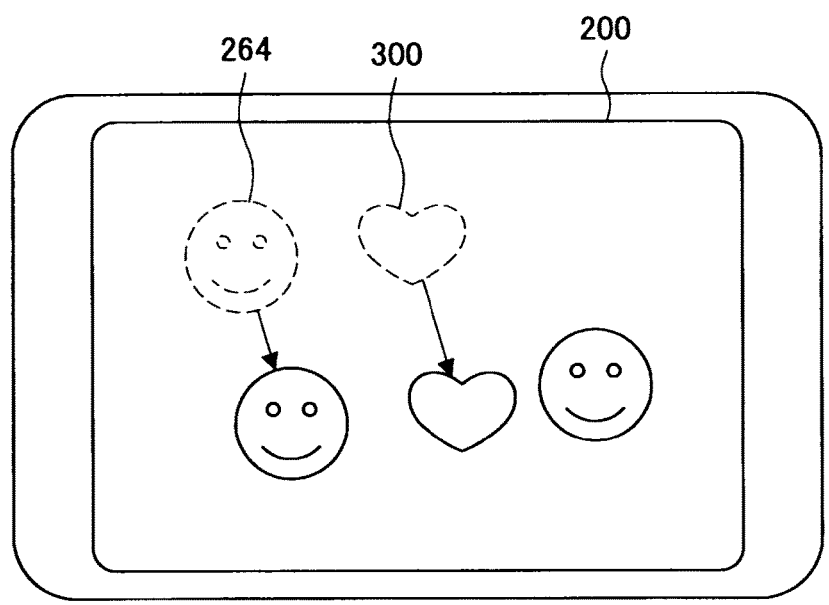
FIG. 12 is an illustrative diagram showing one example in which display of additional data is changed according to a behavior of a feature point of moving image content.

Thus, the additional data metadata created by the additional data creation unit 120 is superimposed and displayed on the moving image content, such that the moving image can be decorated so that the additional information is changed according to the behavior of the feature point of moving image content. For example, it is assumed that a setting is performed so that the additional data 300 follows the feature point 264 according to the motion of the feature point 264 shown in FIG. 12. The feature point 264 and the additional data 300 are displayed in positions indicated by dotted lines at a certain time. Thereafter, when the feature point 264 is moved to a position indicated by a solid line, the additional data 300 also moves to a position indicated by another solid line according to the movement of the feature point 264. Thus, the user can add the additional data changed according to the behavior of the feature point to the moving image content only by creating the additional data to be added to the moving image content and determining a feature point at which the additional data is to be added and an additional data display method.

The process of adding the hand-drawn data to the moving image content has been described. Next, an additional data display process by the display scenario will be described based on FIG. 4. Further, FIG. 4 is a flowchart showing the additional data display process by the display scenario according to the present embodiment.

[Additional Data Display Process by Display Scenario]

Figure 4:
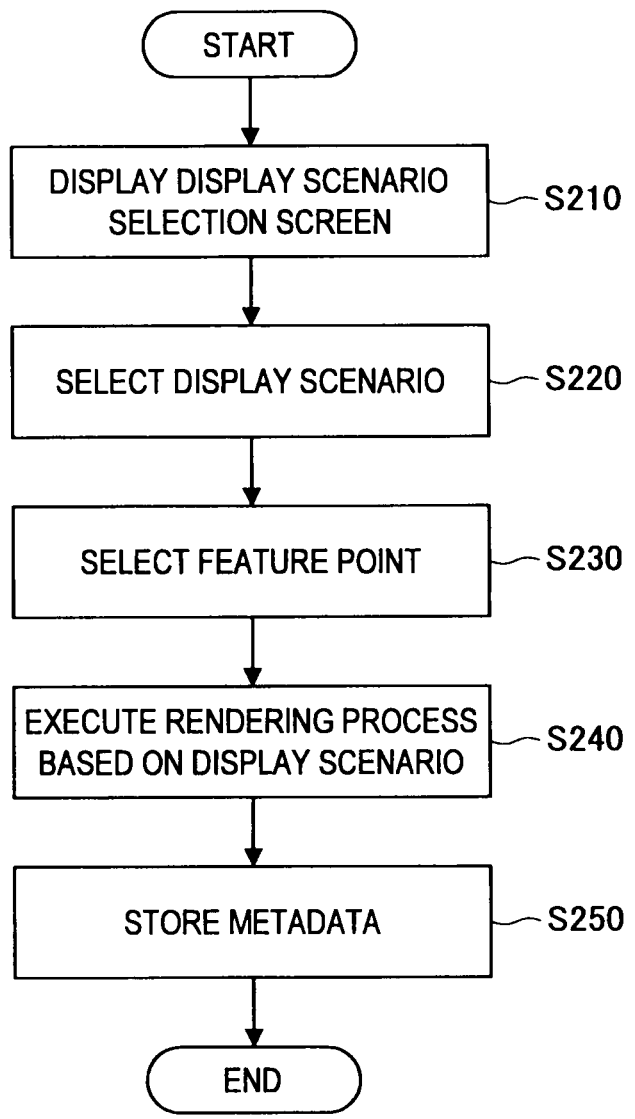
FIG. 4 is a flowchart showing an additional data display process by a display scenario according to the embodiment.

The additional data display process by the display scenario shown in FIG. 4 is executed when the user selects not to perform manual drawing in step S100 of FIG. 3A. That is, it is a case in which drawing is automatically performed based on the motion information of the feature point of the moving image content according to the display scenario. When the user selects such a process, for example, a display scenario selection screen 200f as shown in FIG. 13 is displayed on the display unit 114 (step S210).

Figure 13:
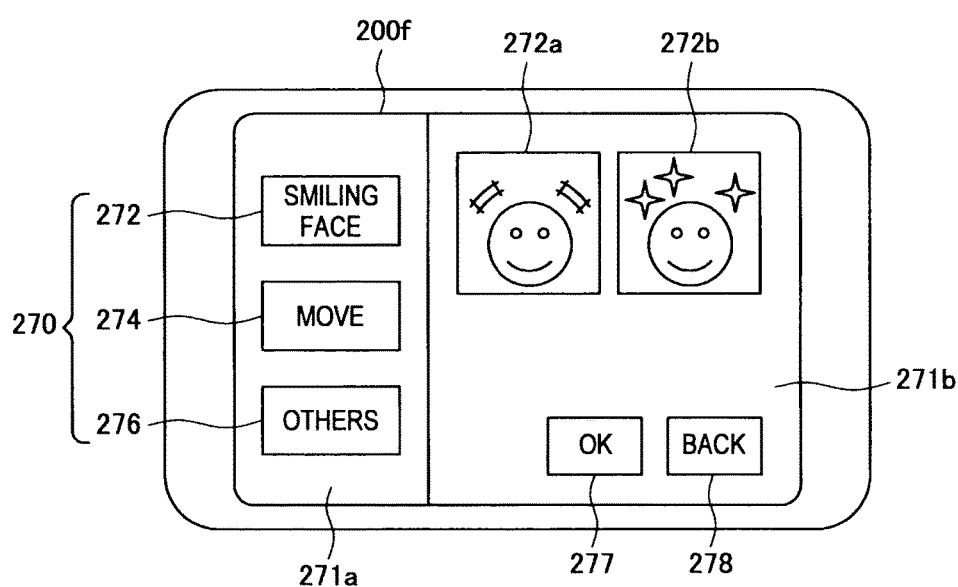
FIG. 13 is an illustrative diagram showing one example of a display scenario selection screen.

The display scenario selection screen 200f includes, for example, a classification area 271a in which a display scenario icon 270 for selecting a previously set display scenario is displayed, and a detail area 271b for performing a detailed setting of display content, as shown in FIG. 13. The display scenario includes, for example a change pattern to display given additional data when a facial expression of a feature point in moving image content is a smiling face or to change and display the additional data according to a feature of the behavior of the feature point. The user selects the display scenario icon 270 including a "smiling face" icon 272, a "motion" icon 274, an "others" icon 276, and the like associated with a change pattern displayed in the classification area 271a. Accordingly, the additional data can be displayed on the moving image content (step S220).

Information for performing the detailed setting of the selected display scenario icon 270 is displayed in the detail area 271*b*. For example, if the user selects the display scenario to display the additional data when the facial expression of the feature point is the smiling face, the additional data creation unit 120 displays one or at least two additional data display examples in the details area 271*b* by referring to the display scenario storage unit 158 of the storage unit 150. In the example of FIG. 13, two display examples 272*a* and 272*b* are displayed. The user may determine the additional data by selecting additional data desired to be added to the feature point from among the display examples 272*a* and 272*b* and selecting the OK icon 277.

Further, the user selects one or at least two feature points to which the additional data is to be added from among the feature points present in the moving image content (step S230). The selection of the feature points may be performed, as in the above-described process in steps S128 and S130. When the above process is terminated and a moving image content pause state is released, a drawing process based on the set display scenario is executed (step S240). The set display scenario is stored as additional data metadata in the metadata storage unit 152 (step S250).

The drawing process based on the display scenario continues to be performed, for example, until the user releases the process. Therefore, where the same display scenario is applied to all moving image contents, only if the user sets the display scenario only once, the additional data is automatically added to the feature point based on the set display scenario when the same scene appears. For example, when a display scenario to display given additional data when a smiling face is detected from a feature point is set, the additional data is automatically displayed each time the smiling face of the feature point is detected. Accordingly, the user need not set the same process several times, making it possible to easily add additional data to moving images.

[Display Scenario Example]

Here, a content example of a display scenario will be described using FIGS. 14 to 20. The display scenario indicates content of a change pattern to change additional data added to the feature point according to the behavior of the feature point, as described above.

Figure 14:
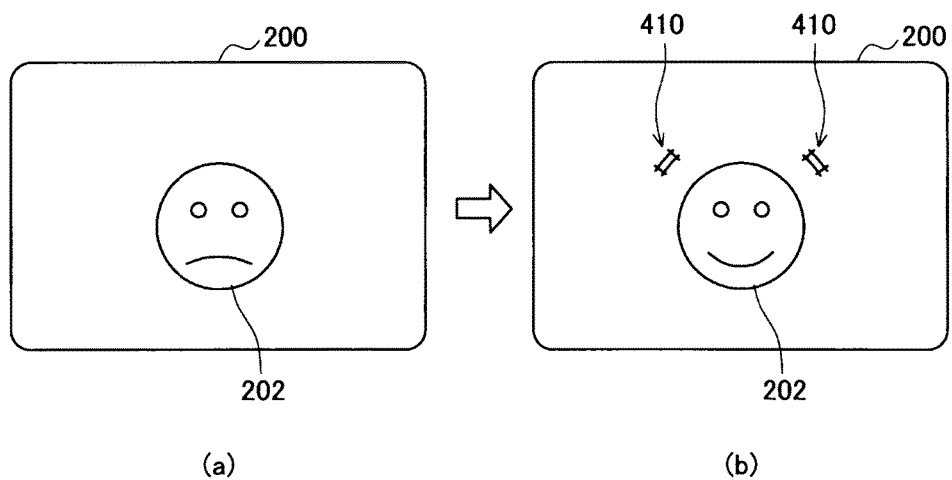
FIG. 14 is an illustrative diagram showing one content example of a display scenario, in which additional data is displayed when a smiling face of a feature point is detected.

In FIG. 14, an example of the display scenario to display additional data when a smiling face of the feature point is detected is shown. In such a display scenario, when a facial expression of the feature point 202 is not a smiling face as shown in FIG. 14(*a*), the additional data creation unit 120 does not display the additional data, whereas when facial expression of the feature point 202 is a smiling face, the additional data creation unit 120 displays additional data 410 as shown in FIG. 14(*b*). Further, the smiling face of the feature point may be detected using an existing method and, for example, by the feature point tracking unit 130.

Figure 15:
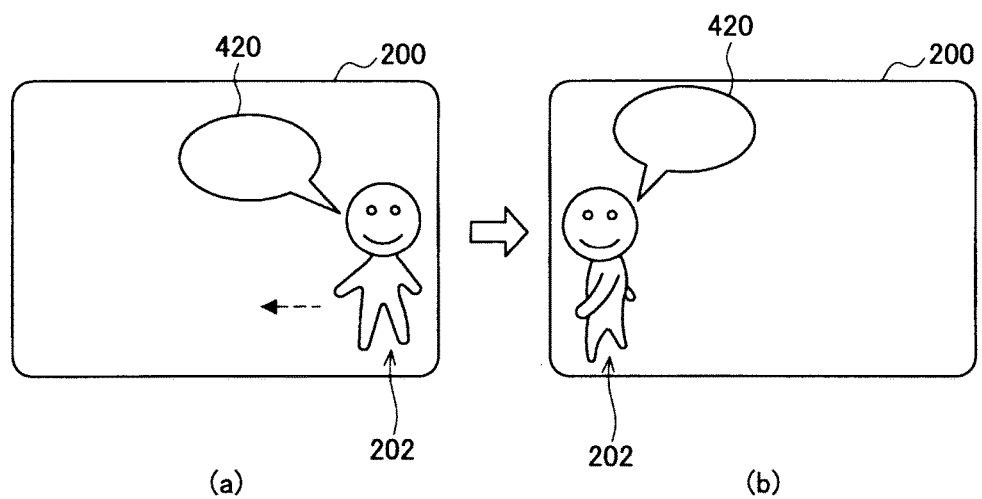
FIG. 15 is an illustrative diagram showing one content example of a display scenario, in which a display position of additional data is changed according to a position of a feature point.

Next, in FIG. 15, an example of the display scenario to display a display position of the additional data according to the position of the feature point is shown. The feature point often moves in the moving image content and the position of the feature point in the image is changed from moment to moment. Such a display scenario allows the additional data to be displayed in the image by following the feature point even when the position of the feature point is changed. For example, the feature point 202 located at a right in the image 200 as shown in FIG. 15(*a*) is assumed to be moved to the left in the image 200 as shown in FIG. 15(*b*). Additional data 420 in a balloon is added to the feature point 202. In this case, using such a display scenario, the additional data 420 displayed at the left of the feature point 202 located at the right end in the image 200 in the state of FIG. 15(*a*) is displayed at the right of the feature point 202 when the feature point 202 moves in the state of FIG. 15(*b*) and is located at the left in the image 200. Thus, even when the position of the feature point 202 is changed, the display position of the additional data 420 is automatically changed so that additional data 420 does not protrude from the image 200.

Figure 16:
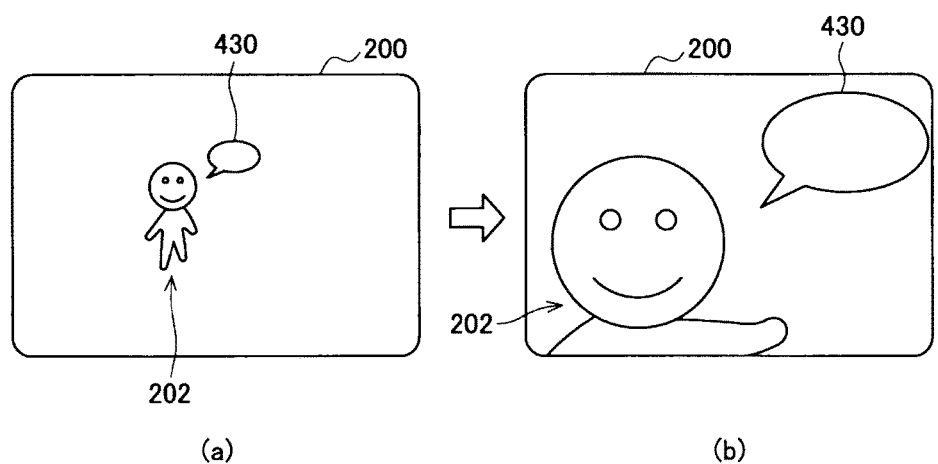
FIG. 16 is an illustrative diagram showing one content example of a display scenario, in which a size of additional data is changed according to a size of a feature point.

Further, in FIG. 16, an example of the display scenario in which the size of the additional data is changed according to the size of the feature point is shown. For example, when the size of the feature point 202 relative to the size of the image 200 is smaller as shown in FIG. 16(*a*), the size of the additional data 430 added to the feature point 202 becomes small. On the other hand, when the size of the feature point 202 relative to the size of the image 200 is greater as shown in FIG. 16(*b*), the size of the additional data 430 added to the feature point 202 becomes greater. Magnification of the additional data 430 may be changed, for example, according to the size of the feature point 202 relative to the size of the image 200. In this case, when the additional data 430 becomes large by the display scenario, the additional data 430 is processed not to protrude from the image 200.

Figure 17:
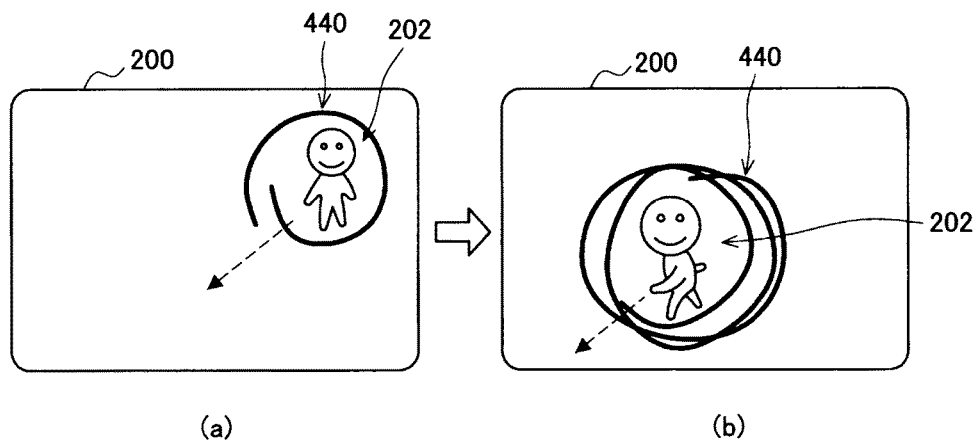
FIG. 17 is an illustrative diagram showing one content example of a display scenario, in which additional data is changed according to a movement speed of the feature point.

Also, in FIG. 17, an example of the display scenario in which additional data is changed according to the movement speed of the feature point is shown. The movement speed of the feature point may be calculated from a change amount of a position of the feature point in the image at a given time. For example, when the movement speed of the feature point 202 is substantially equal to 0 as shown in FIG. 17(*a*), substantially circular additional data 440 added to the feature point 202 is displayed to surround the feature point 202 once. On the other hand, when the movement speed of the feature point 202 increases, the additional data 440 surrounds the feature point 202 twice and three times, as shown in FIG. 17(*b*). Thus, it is possible to represent a feature of the behavior of the feature point 202 by changing the display of the additional data 440 according to a speed change of the feature point 202.

Figure 18:
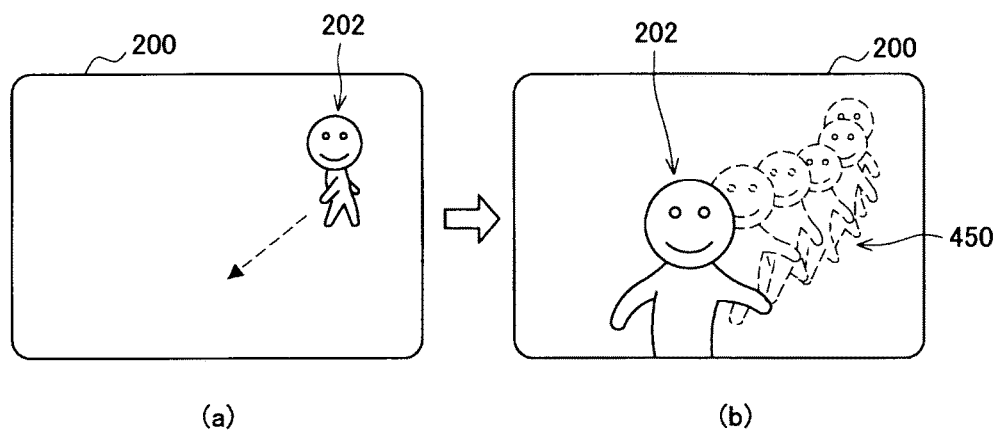
FIG. 18 is an illustrative diagram showing one content example of a display scenario, in which a locus of a movement of a feature point is shown.
Figure 19:
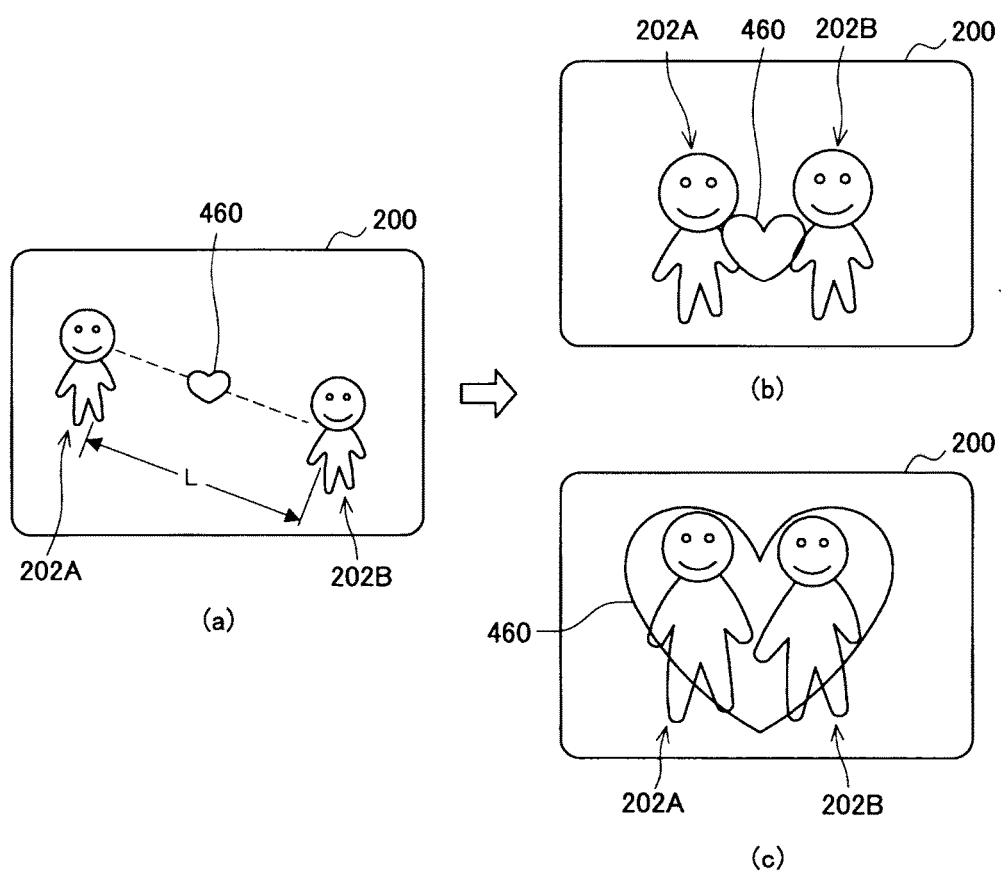
FIG. 19 is an illustrative diagram showing one content example of a display scenario, in which display of additional data is changed according to a distance between feature points.

In FIG. 18, an example of a display scenario to show a locus of the movement of the feature point is shown. For example, as shown in FIG. 19(*a*), a feature point 202 is assumed to move from an upper right of the image 200 to a lower left. In this case, using such a display scenario, the locus of the movement of the feature point is displayed as additional data 450, as shown in FIG. 18(*b*). Accordingly, it is possible to increase visual effects of moving image content.

Also, in FIG. 19, an example of a display scenario to change display of the additional data according to a distance between the feature points is shown. For example, two feature points 202A and 202B are assumed to be associated with one additional data 460, as shown in FIG. 19(*a*). In this case, using such a display scenario, a size or a display position of the additional data 460 is changed according to a size of the distance between the feature points L. When the distance between the feature points L is great as in FIG. 19(*a*), the additional data creation unit 120 displays the small additional data 460 substantially at the middle between the feature points. On the other hand, when the distance between the feature points L is small, the additional data creation unit 120 displays, for example, the additional data 460 larger than that shown in FIG. 19(*a*) between the feature point 202A and the feature point 202B, as shown in FIG. 19(*b*). Alternatively, the additional data creation unit 120 may display the additional data 460 to surround the approaching feature points 202A and 202B, as shown in FIG. 19(c). Thus, it is possible to effectively show a relationship between a plurality of feature points, in the moving image content, by changing the display of the additional data 460 according to the distance between the feature points.

Figure 20:
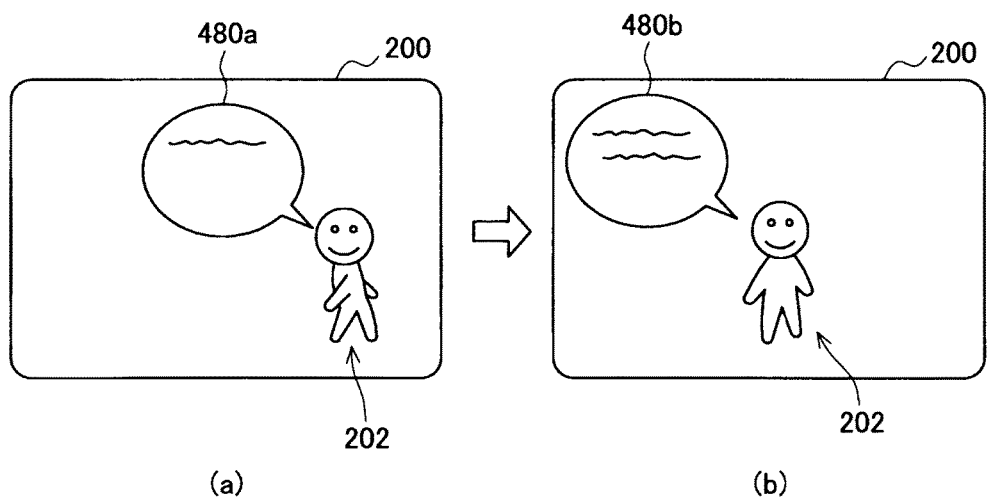
FIG. 20 is an illustrative diagram showing one content example of a display scenario, in which additional data follows a feature point and a text is sequentially displayed over time.

In FIG. 20, an example of a display scenario to cause additional data with motion to follow a feature point is shown. Such a display scenario includes, for example, a change pattern to cause text as additional data to follow the feature point while sequentially displaying the text over time. As shown in FIG. 20(a), one line of text is displayed at a certain time in a balloon as additional data 480a that follows the feature point 202. Thereafter, when a time elapses, additional data 480b moves with movement of the feature point 202 and two lines of text are displayed within the additional data 480b, as shown in FIG. 20(b). Thus, the use of such a display scenario enables the additional data to follow the behavior of the feature point and the additional data with motion to be displayed.

The content example of the display scenario has been described. According to the present embodiment, when the user performs association of the feature point with the additional data and selects a display scenario to change the additional data, the additional data creation unit 120 automatically creates additional data metadata based on the display scenario according to the behavior of the feature point in the moving image content. Also, since the additional data metadata is created according to the display scenario, content of the additional data metadata can be easily changed only by changing the display scenario. That is, it is possible to create a display pattern to display a plurality of additional data from one additional data.

One additional data metadata is created for one moving image content. A change pattern of the additional data according to one or at least two display scenarios is stored in the additional data metadata. The change pattern of the additional data may be set by the methods shown in FIGS. 3A, 3B and 4, and FIG. 5, which will be described below. Thus, it is possible to easily set change patterns of a plurality of additional data and it is easy to add a plurality of additional data in moving image content at a certain time.

[Hand-Drawing Process During Reproduction]

Next, a display process of performing drawing during reproduction of moving image content will be described based on FIG. 5. Further, FIG. 5 is a flowchart showing a hand-drawing process during reproduction according to the present embodiment. When additional data is drawn during reproduction of the moving image content, one can draw while confirming a motion of a feature point of the moving image content, and it is easy to create, for example, additional data with motion as shown in FIG. 20.

The hand-drawing process during reproduction shown in FIG. 5 is executed when the user selects to perform the hand-drawing process during reproduction in step S102 of FIG. 3A. When the user selects such a process, first, a screen to select a drawing tool for creating additional data by hand-drawing is displayed on the display unit 114. In such a screen, the user sets a line type, color and the like to draw (step S310). Further, line type, color or the like of the additional data may be set again after the additional data is drawn.

Then, the user draws additional data while reproducing the moving image content (step S320). Drawing of the additional data may be performed, as in step S118 of FIG. 3A. When the user finishes drawing of the additional data, for example, the user pauses the reproduction of the moving image content and settles such additional data. Accordingly, the additional data with motion is created. The created additional data is associated with a time of moving image content on which such additional data is to be displayed, and the association data is recorded as additional data metadata in the metadata storage unit 152.

The display process in which drawing is performed during reproduction of the moving image content has been described. In this case, the association of the additional data with the feature point may not be particularly performed, but when there is a similar behavior of a feature point in the moving image content, the additional data may be associated with and added to the feature point.

Thus, with the image processing device 100 according to the present embodiment, additional data created using various methods is associated with the feature point, and additional data metadata causing the additional data to be changed according to the behavior of the feature point is automatically generated. Accordingly, it is possible to simply add the additional information to a moving object in a moving image.

While the screen examples shown in FIGS. 6 to 13 cause the manipulation information to be input by selecting the icons associated with the process executed, for example, by the stylus 116, the present invention is not limited to such examples. For example, tracing of the surface of the display unit 114 by a manipulation body such as the stylus 116 or a finger (an operation of a manipulation body) may execute a given process associated with such a manipulation. Specifically, a given process may be associated with a given operation to perform a screen manipulation, as the page moves to a next page when a right side of the screen is touched by the manipulation body, and the page moves to a previous page when a left side of the screen is touched.

[Hardware Configuration Example]

Figure 21:
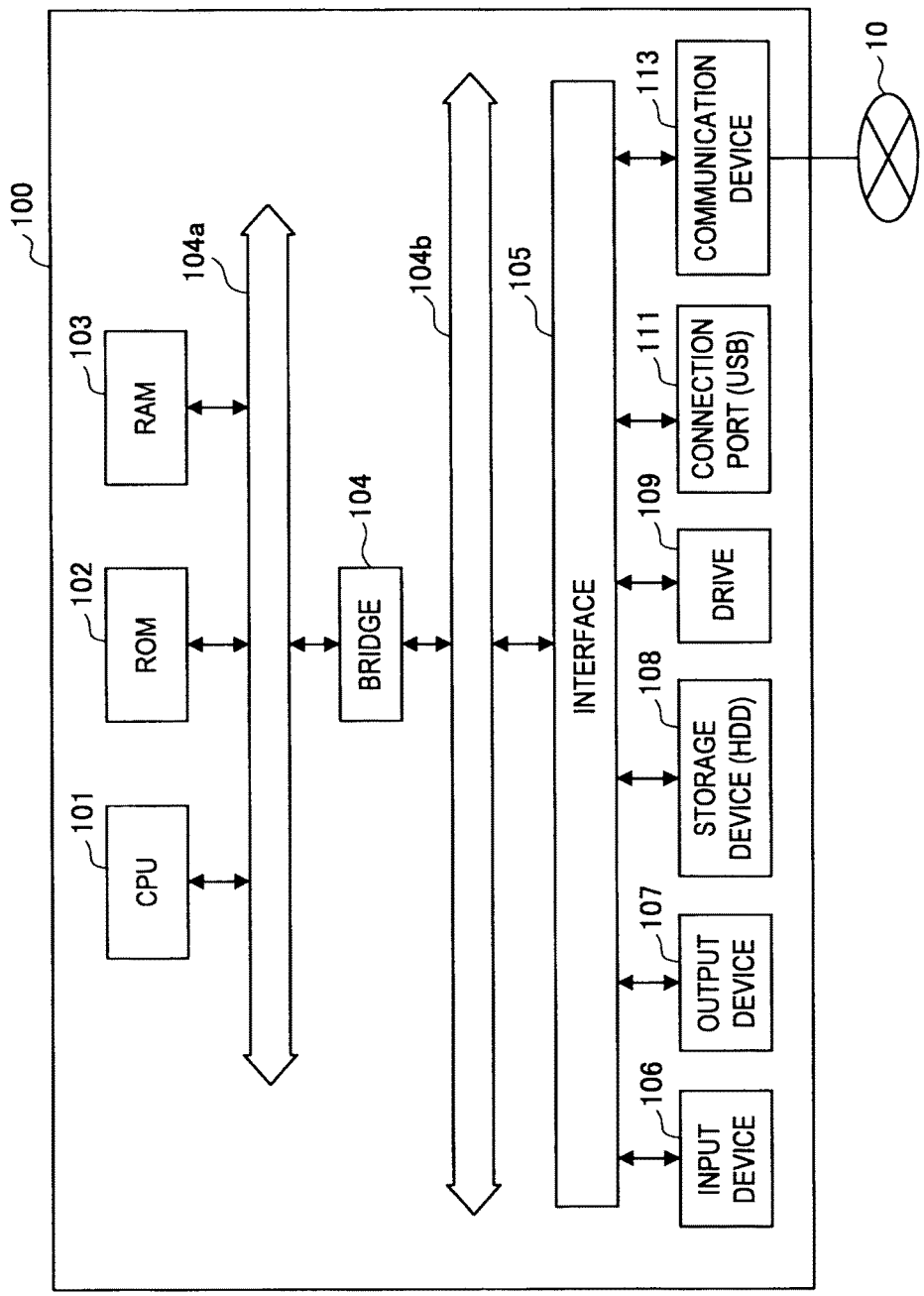
FIG. 21 illustrates a hardware configuration showing a configuration of the image processing device according to the embodiment.

Image processing in the image processing device 100 according to the present embodiment may be executed by hardware or may be executed by software. In this case, a computer as shown in FIG. 21 is included in the image processing device 100. Hereinafter, an example of a hardware configuration of the image processing device 100 according to the present embodiment will be described based on FIG. 21. Further, FIG. 21 illustrates a hardware configuration showing the image processing device 100 according to the present embodiment.

The image processing device 100 of the present embodiment includes a central processing unit (CPU) 101, a read only memory (ROM) 102, a random access memory (RAM) 103, and a host bus 104a. Also, the image processing device 100 includes a bridge 104, an external bus 104b, an interface 105, an input device 106, an output device 107, a storage device (HDD) 108, a drive 109, a connection port 111, and a communication device 113.

The CPU 101 functions as an operation processing device and a control device, and controls general operation of the image processing device 100 according to various programs. Also, the CPU 101 may be a microprocessor. The ROM 102 stores programs, operation parameters, and the like used by the CPU 101. The RAM 103 temporarily stores a program used in the execution of the CPU 101, parameters properly changed in the execution, and the like. They are connected to each other by a host bust 104a, which includes a CPU bus.

The host bust 104a is connected to an external bus 104b such as a peripheral component interconnect/interface (PCI) bus via the bridge 104. Further, the host bus 104a, the bridge 104 and the external bus 104b need not be configured separately, and one bus may have such functions.

The input device 106 includes an input means for enabling the user to input information, such as a mouse, a keyboard, a touch screen, buttons, a microphone, a switch, and a lever, an input control circuit for generating an input signal based on an input by the user and outputting the input signal to the CPU 101, and the like. The user of the image processing device 100 may input various data to the image processing device 100 or instruct a processing operation by manipulating the input device 106. In the present embodiment, the input device 106 includes a touch screen, as shown in FIG. 1.

The output device 107 includes, for example, a display device such as a cathode ray tube (CRT) display device, a liquid crystal display (LCD) device, an organic light emitting diode (OLED) device, and a lamp. Further, the output device 107 includes a sound output device, such as a speaker and a headphone. In the present embodiment, the display unit 114 of the input display unit 110 is provided as the output device 107, as shown in FIG. 1.

The storage device 108 is a data storage device as one example of the storage unit of the image processing device 100. The storage device 108 may include a recording medium, a recording device for recording data in the recording medium, a reading device for reading the data from the recording medium, a deleting device for deleting the data recorded in the recording medium, and the like. The storage device 108 includes, for example, a hard disk drive (HDD). This storage device 108 stores programs executed by the CPU 101 by driving the hard disk, or various data.

The drive 109 is a reader/writer for a recording medium, which is embedded in the image processing device 100 or provided as an external device. The drive 109 reads information recorded in a removable recording medium that is mounted, such as a magnetic disk, an optical disk, a magneto optical disk, or a semiconductor memory, and outputs the information to the RAM 103.

The connection port 111 is an interface connected with an external device, which is a connection port with an external device capable of transmitting data, for example, via a universal serial bus (USB). Also, the communication device 113 is, for example, a communication interface configured of, for example, a communication device for connecting to a communication network 15. Also, the communication device 112 may be a wireless local area network (LAN)-compliant communication device, a wireless USB-compliant communication device, or a wired communication device for performing wired communication.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, while in the embodiment, the moving image content and the additional data metadata are held as separate data, the present invention is not limited to such an example. For example, the additional data metadata may be encoded together with the moving image content and stored in a storage unit.

The invention claimed is:

1. An image processing device comprising:
circuitry configured to
detect a feature point from stored moving image data;
associate the feature point with additional information, the feature point being selected based on feature point selection information, wherein the additional information includes image data that is displayed as added to a reproduction of the stored moving image data;
analyze a changing behavior of the feature point through the reproduction of the stored moving image data;
generate data indicating change content to change display of the image data of the additional information associated with the feature point based on motion information indicating the behavior of the feature point analyzed and a display scenario indicating a change pattern to change the additional information associated with the feature point according to the behavior of the feature point; and
control a display device to display the reproduction of the stored moving image data and to display the image data of the additional information based on the change content such that the image data of the additional information has motion corresponding to motion of the feature point of the stored moving image data,
wherein when selection information to select at least two feature points, including the detected feature point, is input, the circuitry is configured to generate data to generate a display size of the additional information according to a distance between the at least two feature points.

2. The image processing device according to claim 1, wherein the circuitry is configured to accept input of the feature point selection information.

3. The image processing device according to claim 1, wherein
the circuitry is configured to
select at least one stored display scenario as a selected display scenario based on the behavior of the feature point, and
generate data to display the additional information using a display method defined in the selected display scenario.

4. The image processing device according to claim 3, wherein the at least one display scenario stored is predetermined.

5. The image processing device according to claim 4, wherein the display scenario selection information includes information corresponding to a user selection of at least one display scenario stored.

6. The image processing device according to claim 3, wherein the at least one display scenario stored is previously set.

7. The image processing device according to claim 6, wherein the display scenario selection information includes information corresponding to a user selection of at least one display scenario stored.

8. The image processing device according to claim 3, wherein the display scenario selection information includes information corresponding to a user selection of at least one display scenario stored.

9. The image processing device according to claim 1, wherein the circuitry is configure to:
store at least one piece of additional information, and
accept input of selection information for selecting the additional information associated with the feature point.

10. The image processing device according to claim 1, wherein the circuitry is configured to accept input of additional information by hand-drawing.

11. The image processing device according to claim 1, wherein the circuitry is configured to generate data to change a display position of the additional information associated with the feature point based on a position of the feature point in an image of moving image data recognized from the motion information.

12. The image processing device according to claim 1, wherein the circuitry is configured to generate data to change a size of the additional information associated with the feature point based on a size of the feature point relative to a display size of moving image data recognized from the motion information.

13. The image processing device according to claim 1, wherein the circuitry is configured to generate data to display the additional information associated with the feature point according to a change of a facial expression of the feature point recognized from the motion information.

14. The image processing device according to claim 1, wherein the circuitry is configured to generate data to change display of the additional information associated with the feature point according to a movement speed of the feature point recognized from the motion information.

15. The image processing device according to claim 1, wherein the display scenario selection information includes a user selection of the display scenario.

16. An image processing method comprising the steps of:
detecting at least one feature point from stored moving image data;
associating the at least one feature point with additional information, wherein the additional information includes image data that is displayed as added to a reproduction of the stored moving image data;
analyzing a changing behavior of the at least one feature point through the reproduction of the stored moving image data;
generating data indicating change content to change display of the image data of the additional information associated with the at least one feature point based on motion information indicating the analyzed behavior of the at least one feature point and a display scenario indicating a change pattern to change the additional information associated with the at least one feature point; and
controlling a display device to display the reproduction of the stored moving image data and to display the image data of the additional information based on the change content such that the image data of the additional information has motion corresponding to motion of the at least one feature point of the stored moving image data,
wherein when selection information to select at least two feature points, including the detected at least one feature point, is input, the method further comprises generating data to generate a display size of the additional information according to a distance between the at least two feature points.

17. The image processing method according to claim 16, wherein the display scenario selection information includes a user selection of the display scenario.

18. A non-transitory computer readable medium storing a program for causing at least one processor to perform a method comprising:
detecting a feature point from stored moving image data;
associating the feature point with additional information, the feature point being selected based on feature point selection information, wherein the additional information includes image data that is displayed as added to a reproduction of the stored moving image data;
analyzing a changing behavior of the feature point through the reproduction of the stored moving image data;
generating data indicating change content to change display of the image data of the additional information associated with the feature point based on motion information indicating the behavior of the feature point analyzed and a display scenario indicating a change pattern to change the additional information associated with the feature point according to the behavior of the feature point; and
controlling a display device to display the reproduction of the stored moving image data and to display the image data of the additional information based on the change content such that the image data of the additional information has motion corresponding to motion of the feature point of the stored moving image data,
wherein when selection information to select at least two feature points, including the detected feature point, is input, the method further comprises generating data to generate a display size of the additional information according to a distance between the at least two feature points.

19. The non-transitory computer readable medium according to claim 18, wherein the display scenario selection information includes a user selection of the display scenario.

* * * * *